(12) United States Patent
Chang

(10) Patent No.: US 6,954,578 B2
(45) Date of Patent: Oct. 11, 2005

(54) SUBSTRATE FOR MOUNTING OPTICAL COMPONENT AND METHOD OF MANUFACTURING THE SAME

(75) Inventor: Dong-hoon Chang, Anyang (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 155 days.

(21) Appl. No.: 10/372,191

(22) Filed: Feb. 25, 2003

(65) Prior Publication Data

US 2004/0063235 A1 Apr. 1, 2004

(30) Foreign Application Priority Data

Oct. 1, 2002 (KR) ................................ 10-2002-0059779

(51) Int. Cl.[7] ................................................. G02B 6/00
(52) U.S. Cl. ........................... 385/136; 385/33; 385/34; 385/137
(58) Field of Search ............................. 385/14, 31, 49, 385/88, 89, 92, 94, 33, 34, 93, 136, 137

(56) References Cited

U.S. PATENT DOCUMENTS

| | | | | |
|---|---|---|---|---|
| 4,897,711 A | * | 1/1990 | Blonder et al. | ................ 257/48 |
| 5,017,263 A | * | 5/1991 | Clark | ........................... 438/27 |
| 5,848,211 A | * | 12/1998 | Yang et al. | ..................... 385/93 |
| 5,961,849 A | | 10/1999 | Bostock et al. | ................ 216/24 |
| 6,035,664 A | * | 3/2000 | Hashizume | ..................... 65/36 |
| 6,071,017 A | * | 6/2000 | Gilliland et al. | .............. 385/93 |
| 2003/0072543 A1 | * | 4/2003 | Yoshizawa | ..................... 385/93 |
| 2003/0133690 A1 | * | 7/2003 | Kabs et al. | .................. 385/137 |

FOREIGN PATENT DOCUMENTS

JP        9-145958 A        6/1997

* cited by examiner

*Primary Examiner*—Brian M. Healy
(74) *Attorney, Agent, or Firm*—Sughrue Mion, PLLC

(57) ABSTRACT

A substrate for mounting an optical component such that a cylindrical lens can be passively aligned in an exact position, and a method of manufacturing the same are provided. The substrate includes a groove, which is recessed into the substrate to have a slanted sidewall; and a stopper, which is formed on the groove using a photolithographic process such that the stopper is in contact with the optical component mounted in the groove and defines a position of the optical component. The method includes forming a groove having a slanted sidewall by etching a substrate and forming a stopper, which is in contact with an optical component mounted in the groove and defines a position of the optical component, by performing a photolithographic process on the substrate having the groove.

8 Claims, 10 Drawing Sheets

SUBSTRATE FOR MOUNTING OPTICAL COMPONENT AND METHOD OF MANUFACTURING THE SAME

CROSS-REFERENCE TO RELATED APPLICATIONS

This application claims the priority of Korean Patent Application No. 2002-59779, filed on Oct. 1, 2002, which is incorporated herein in its entirety by reference.

BACKGROUND OF THE INVENTION

1. Field of the Invention

The present invention relates to a substrate for mounting an optical component and a method of manufacturing the same and, more particularly, to a substrate for mounting an optical component such that a cylindrical lens can be passively aligned in an exact position, and a method of manufacturing the same.

2. Description of the Related Art

Generally, in order to realize the high integration and low price of optical communication systems, a technique of mounting optical components, such as a laser diode, a lens, and an optical fiber, on a single substrate, i.e., a silicon platform, is used.

Referring to FIG. 1, in a conventional substrate 10 for mounting an optical component, a groove 11 is formed on the substrate 10. An optical component, such as a light source, e.g., a laser diode 21, or a ball lens 23, is mounted in the groove 11.

The ball lens 23 is disposed in the groove 11. To receive the ball lens 23, the groove 11 has a quadrilateral shape having walls in x- and z-directions. The walls are formed so as to be slanted. Accordingly, when the ball lens 23 is mounted in the groove 11, the ball lens 23 can be installed on the x-z planes at a certain position without any swinging, so it can be passively aligned. In the meantime, when a cylindrical lens is used instead of the ball lens 23, an error occurs in one direction.

FIGS. 2 and 3 are schematic perspective and cross-sectional views, respectively, of a state in which a cylindrical lens 25 is received in the groove 11 formed on the substrate 10 shown in FIG. 1. Referring to FIGS. 2 and 3, the cylindrical lens 25 is aligned at a certain position of a slanting wall of the groove 11 in the x-direction. However, a gap "g" exists between a side of the cylindrical lens 25 and a wall of the groove 11 in the z-direction because the side of the cylindrical lens 25 is a perpendicular plane. Accordingly, the cylindrical lens 25 cannot be passively aligned in the z-direction.

SUMMARY OF THE INVENTION

An apparatus consistent with the present invention relates to a substrate for mounting an optical component, which allows a cylindrical lens to be passively aligned in an exact position, and a method of manufacturing the same.

In one aspect of the present invention, there is provided a substrate for mounting an optical component. The substrate includes a groove, which is recessed into the substrate to have a slanted sidewall; and a stopper, which is formed on the groove, for example but not by way of limitation, using a photolithographic process such that the stopper is in contact with the optical component mounted in the groove and defines a position of the optical component.

In this case, a part of the stopper is formed on a top surface of the substrate, and the other part of the stopper is formed along the slanted sidewall of the groove. Alternatively, a part of the stopper is formed on a top surface of the substrate, and the other part of the stopper is formed above the sidewall of the groove to be separated from the groove.

In another aspect of the present invention, there is provided a method of manufacturing a substrate for mounting an optical component. The method includes forming a groove having a slanted sidewall by etching a substrate and forming a stopper, which is in contact with an optical component mounted in the groove and defines a position of the optical component, by performing a photolithographic process on the substrate having the groove.

In still another aspect of the present invention, there is provided a method of manufacturing a substrate for mounting an optical component. The method includes forming a stopper, which defines a position of an optical component to be mounted on a substrate, on the substrate using a photolithographic process; and forming a groove, which has a slanted sidewall and receives the optical component therein, by etching the substrate having the stopper using a photolithographic process.

BRIEF DESCRIPTION OF THE DRAWINGS

The above features and advantages of the present invention will become more apparent by describing in detail illustrative, non-limiting embodiments thereof with reference to the attached drawings, in which.

DETAILED DESCRIPTION OF THE ILLUSTRATIVE, NON-LIMITING EMBODIMENTS

Figure 1:
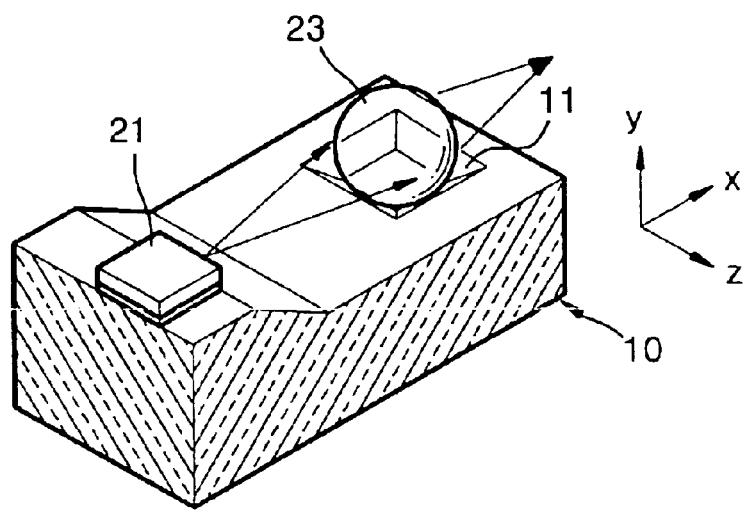
FIG. 1 is a schematic perspective view of a conventional substrate for mounting an optical component.
Figure 2:
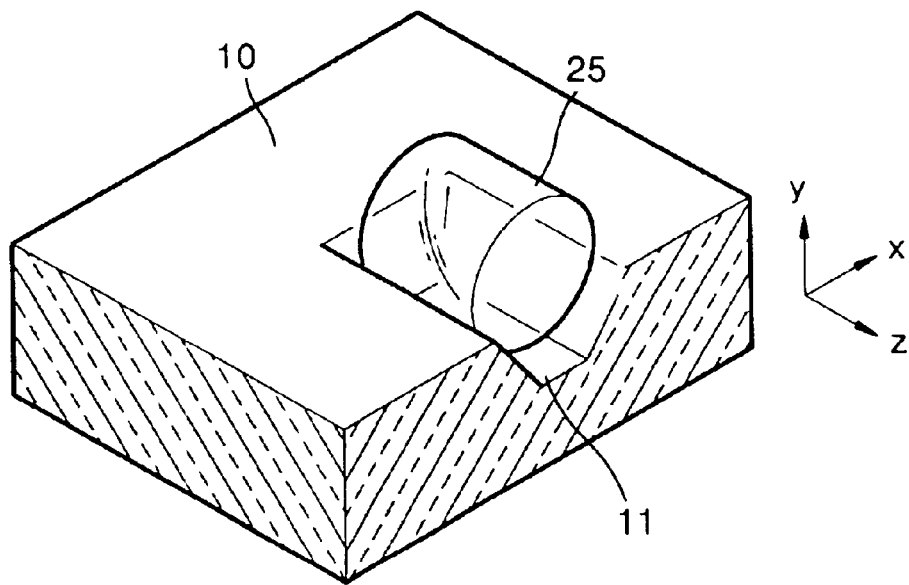
FIGS. 2 and 3 are schematic perspective and cross-sectional views, respectively, of a state in which a cylindrical lens is mounted on a conventional substrate for mounting an optical component.
Figure 3:
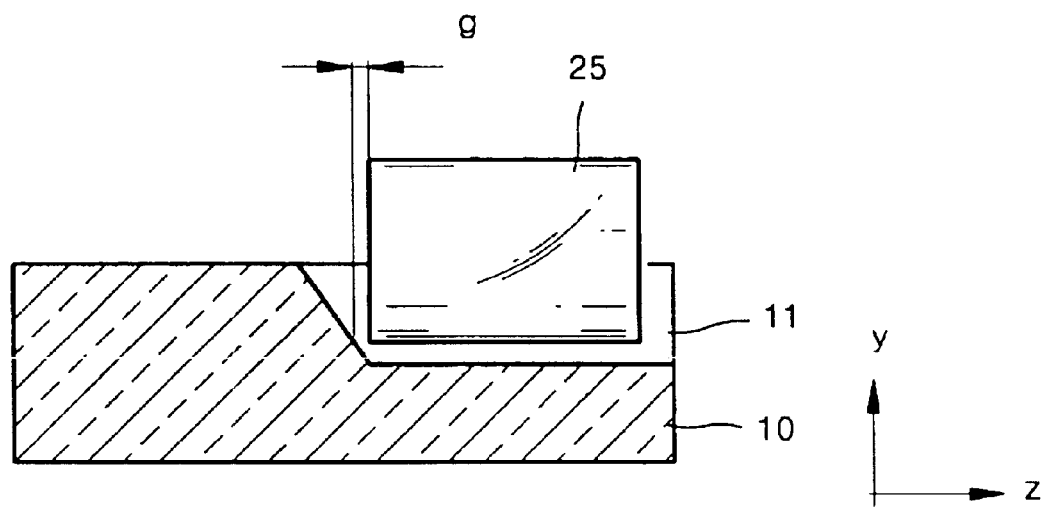
Figure 4:
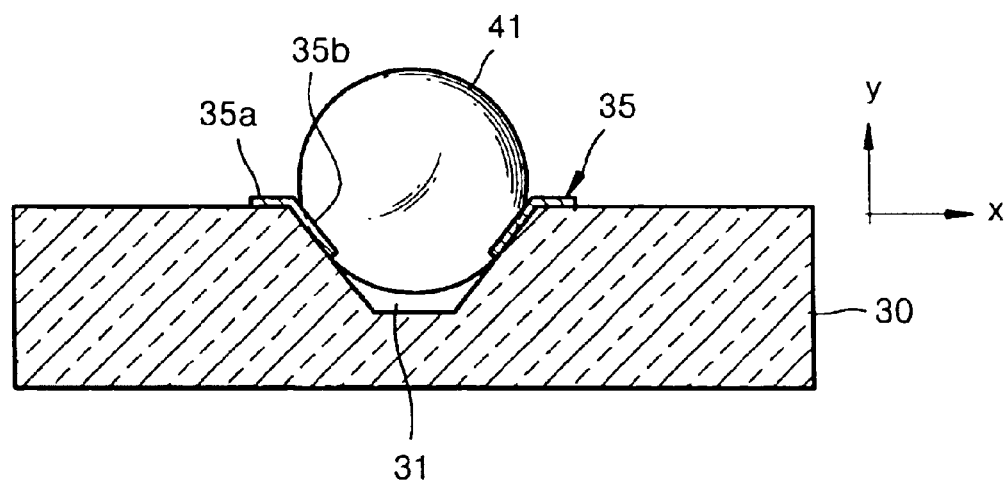
FIG. 4 is a schematic cross-sectional view of a substrate for mounting an optical component according to a first, exemplary embodiment of the present invention.
Figure 5:
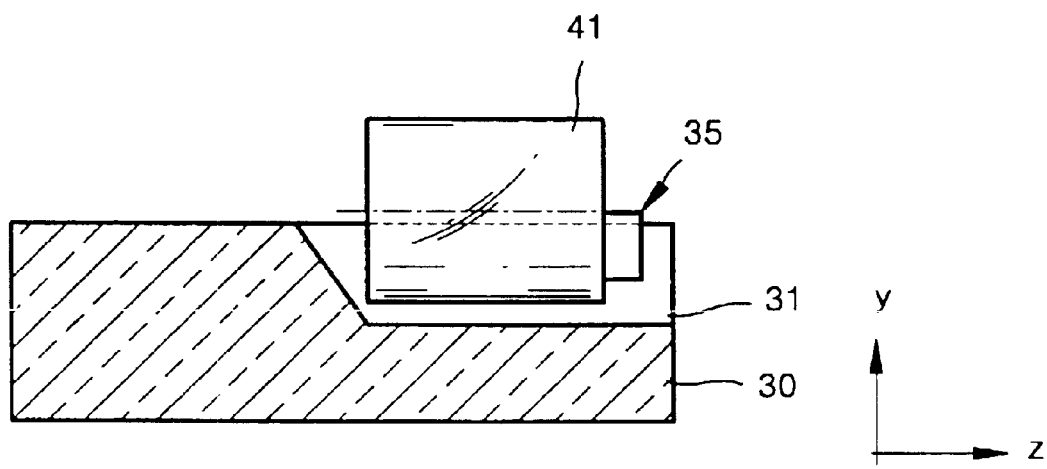
FIG. 5 is another schematic cross-sectional view of the substrate for mounting an optical component according to the first embodiment of the present invention.

Referring to FIGS. 4 and 5, a substrate 30 for mounting an optical component according to a first, exemplary embodiment of the present invention includes a groove 31 and a stopper 35. The stopper 35 is in contact with an optical component, such as a cylindrical lens 41, mounted in the groove 31 and defines the position of the optical component.

The substrate 30 is composed of a silicon wafer having, for example, a <100> crystal orientation, and the groove 31 is formed using an anisotropic etching process such that a sidewall of the groove 31 is slanted downward in the substrate 30.

The stopper 35 is formed using, for example, a photoresist process such that a part 35a of the stopper 35 is formed on the top surface of the substrate 30 and the other part 35b of the stopper 35 is formed along the slanted sidewall of the groove 31. Accordingly, when the cylindrical lens 41 is mounted in the groove 31, if one side of the cylindrical lens 41 is in contact with the stopper 35, a passive alignment in a z-direction can be easily achieved. In other words, by forming the stopper 35 using a photoresist process, an assembly tolerance of the cylindrical lens 41 in the z-direction can be maintained within ±5 μm.

Illustratively, the stopper 35 is made of a polymer or metallic material. A polymer material induces light, so the stopper 35 can be directly formed on the substrate 30 by forming a mask on a polymer and partially removing the polymer using exposure and cleaning. In the meantime, when the stopper 35 is made of a metallic material, the stopper 35 can be formed by forming a mold having a pattern corresponding to the stopper 35 using a polymer and then performing metal plating on the substrate 30 having the mold.

Figure 6:
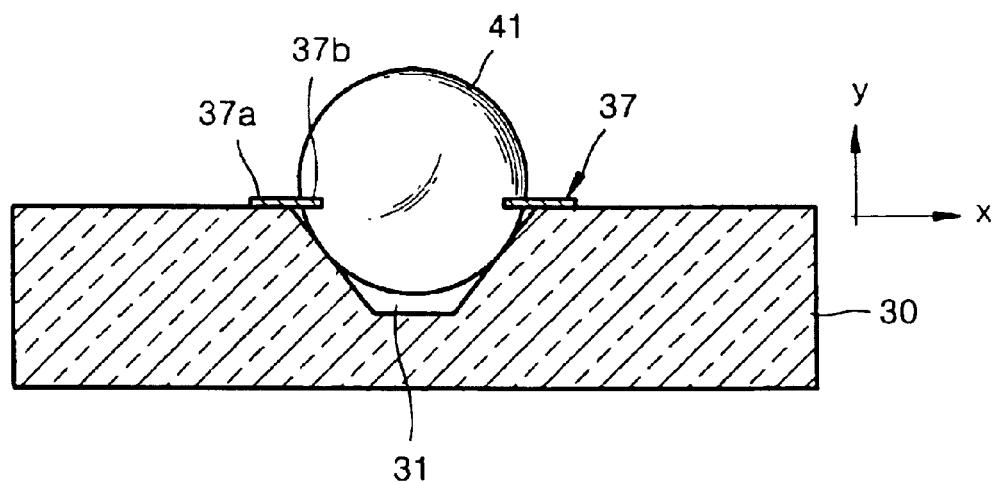
FIG. 6 is a schematic cross-sectional view of a substrate for mounting an optical component according to a second, exemplary embodiment of the present invention.
Figure 7:
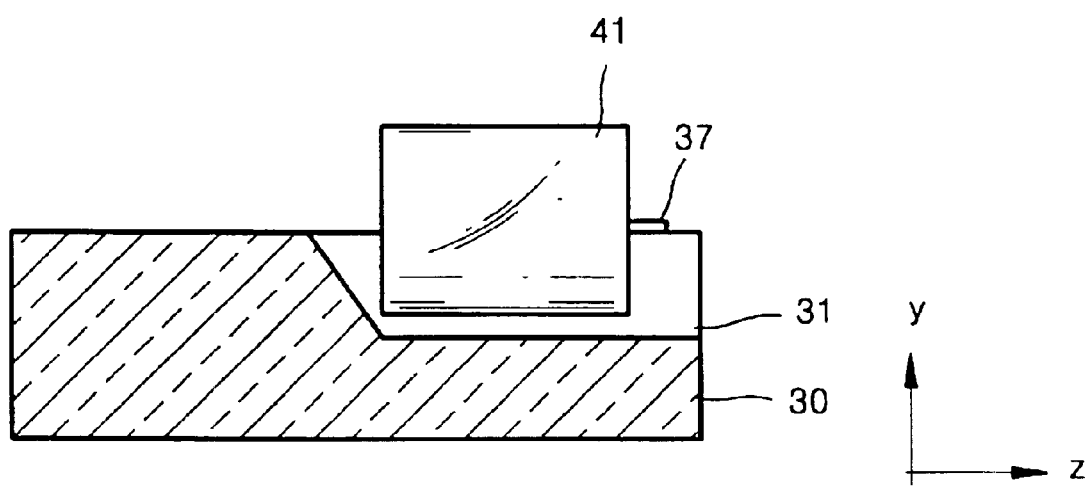
FIG. 7 is another schematic cross-sectional view of the substrate for mounting an optical component according to the second embodiment of the present invention.

Referring to FIGS. 6 and 7, a substrate 30 for mounting an optical component according to a second, exemplary embodiment of the present invention includes a groove 31 and a stopper 37. The stopper 37 is in contact with an optical component mounted in the groove 31 and defines the position of the optical components.

The substrate 30 is composed of a silicon wafer having, for example, a <100> crystal orientation, and the groove 31 is formed using an anisotropic etching process such that a sidewall of the groove 31 is slanted downward in the substrate 30. The stopper 37 is formed using a photoresist process such that a part 37a of the stopper 37 is formed on the top surface of the substrate 30 and the other part 37b of the stopper 37 is formed above the slanted sidewall of the groove 31 to be separated from the slanted sidewall.

Accordingly, when a cylindrical lens 41 is installed in the groove 31, if one side of the cylindrical lens 41 is in contact with the stopper 37, a passive alignment in a z-direction can be easily achieved. In other words, by forming the stopper 37 using a photoresist process, an assembly tolerance of the cylindrical lens 41 in the z-direction can be maintained within ±5 μm.

Illustratively, the stopper 37 is made of a polymer or metallic material. A polymer material induces light, so the stopper 37 can be directly formed on the substrate 30 by forming a mask on a polymer and partially removing the polymer using exposure and cleaning. In the meantime, when the stopper 37 is made of a metallic material, the stopper 37 can be formed by forming a mold having a pattern corresponding to the stopper 37 using a polymer and then performing metal plating on the substrate 30 having the mold.

Referring to FIGS. 8A through 8F, a method of manufacturing a substrate for mounting an optical component according to a first embodiment consistent with the present invention includes forming a groove 52 in a substrate 51 and forming a stopper 59 on the substrate 51 using a photolithographic process.

Figure 8A:
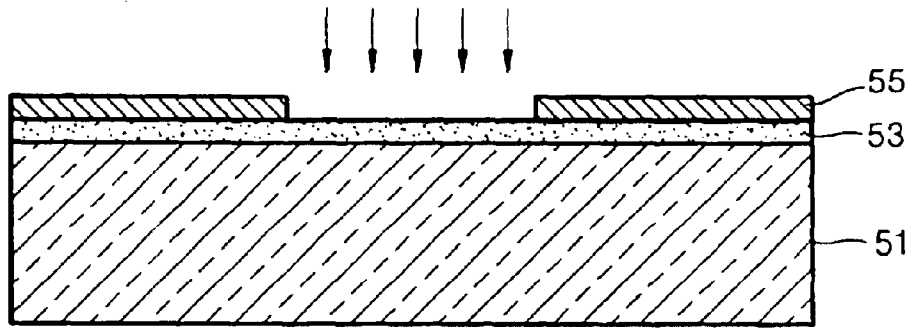
FIGS. 8A through 9C are cross-sectional views of the stages in a method of manufacturing a substrate for mounting an optical component according to a first, exemplary embodiment of the present invention.
Figure 8B:
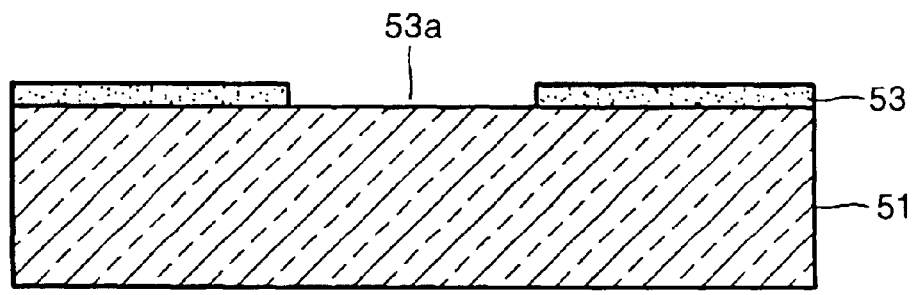
Figure 8C:
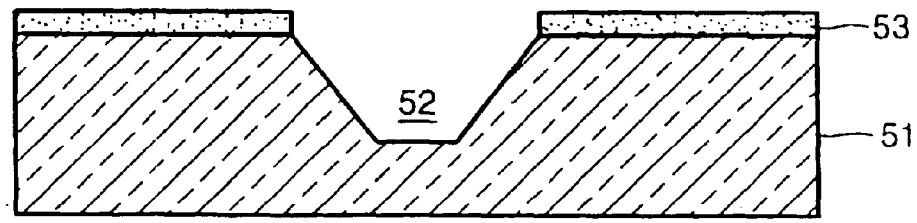
Figure 8D:
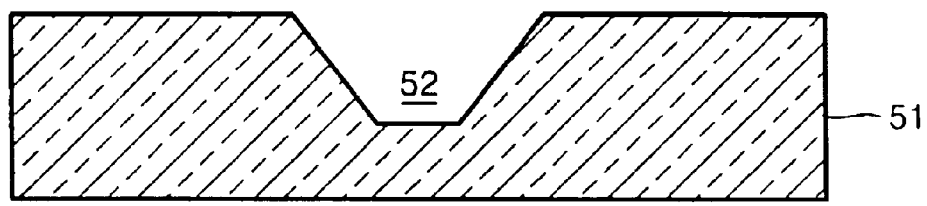

FIGS. 8A through 8D show the stages of forming the groove 52 by etching the substrate 51. Referring to FIG. 8A, after a photoresist 53 is applied to the substrate 51, a mask 55 having a pattern corresponding to the groove 52 is disposed on the photoresist 53, and the photoresist 53 is partially photosensitized using an exposure process. Thereafter, referring to FIG. 8B, an opening 53a corresponding to the groove 52 is formed by performing a cleaning process after removing the mask 55. Next, a nonisotropic etching process is performed, as shown in FIG. 8C, thereby forming the groove 52 having a slanted sidewall, as shown in FIG. 8D.

Figure 8E:
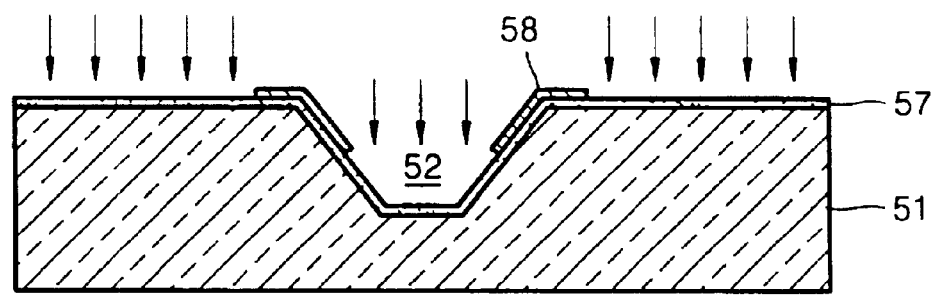
Figure 8F:
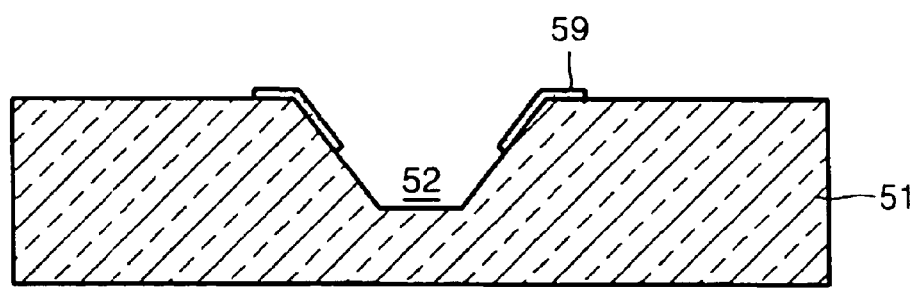

FIGS. 8E and 8F show an example of a procedure of forming the stopper 59. Referring to FIG. 8E, a polymer layer 57 inducing light is formed on the top surface of the substrate 51 having the groove 52, and a mask 58 having a shape corresponding to the stopper 59 is disposed at a predetermined position. Subsequently, the polymer layer 57 is partially removed using exposure and cleaning, thereby forming the stopper 59 on the substrate 51 and the groove 52, as shown in FIG. 8F.

Figure 9A:
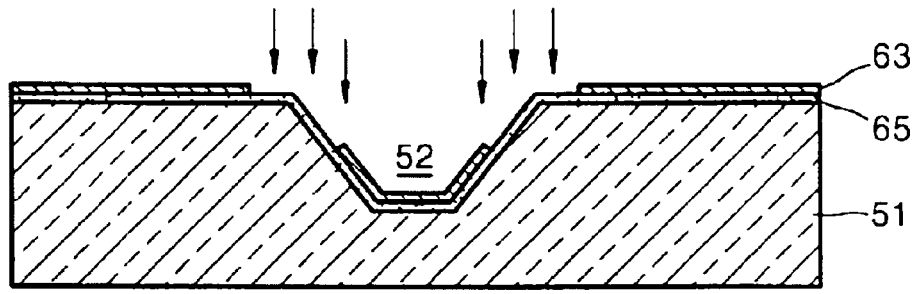
Figure 9B:
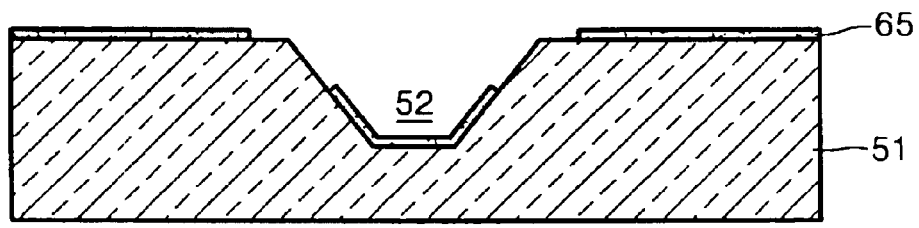
Figure 9C:
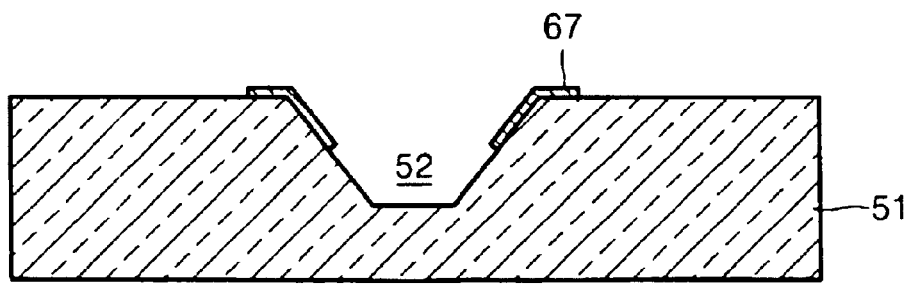

FIGS. 9A through 9C show another example of a procedure of forming a stopper after forming a groove 52 in the stages shown in FIGS. 8A through 8D. Referring to FIG. 9A, after a polymer layer 65 inducing light is formed on the top surface of the substrate 51 having the groove 52, a mask 63 having a shape corresponding to the stopper is disposed on a predetermined position, and then an exposure process is performed. Subsequently, the mask 63 and a part of the polymer layer 65 are removed using a cleaning process, thereby forming a mold 65, as shown in FIG. 9B. Thereafter, the mold 65 is plated with a metal, thereby forming a stopper 67, and then the mold 65 is removed, as shown in FIG. 9C.

Referring to FIGS. 10A through 12, a method of manufacturing a substrate for mounting an optical component according to a second, exemplary embodiment of the present invention includes forming a stopper 77 on a substrate 71 using a photolithographic process and forming a groove 72 by etching the substrate 71 having the stopper 77.

Figure 10A:
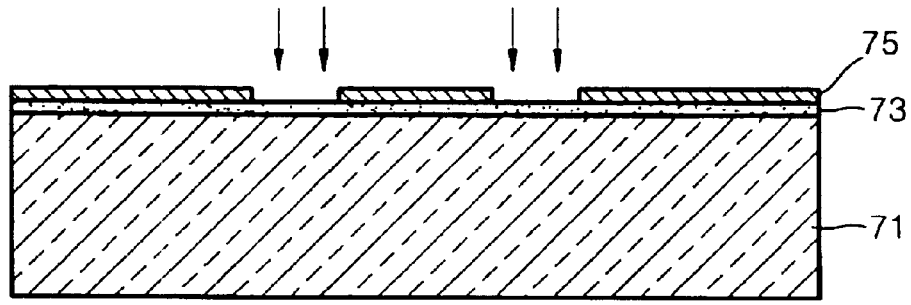
FIGS. 10A through 10G are cross-sectional views of the stages in a method of manufacturing a substrate for mounting an optical component according to a second, exemplary embodiment of the present invention.
Figure 10B:
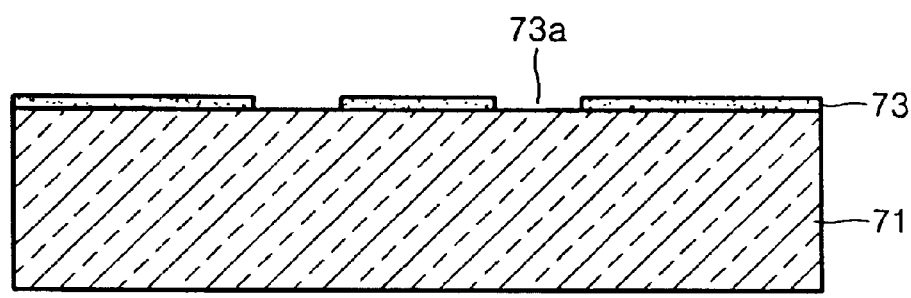
Figure 10C:
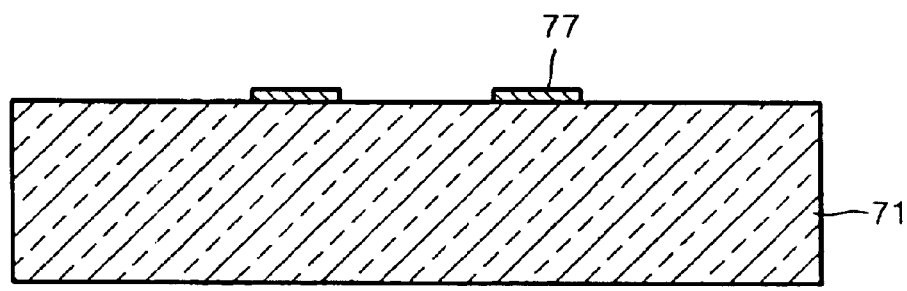
Figure 11:
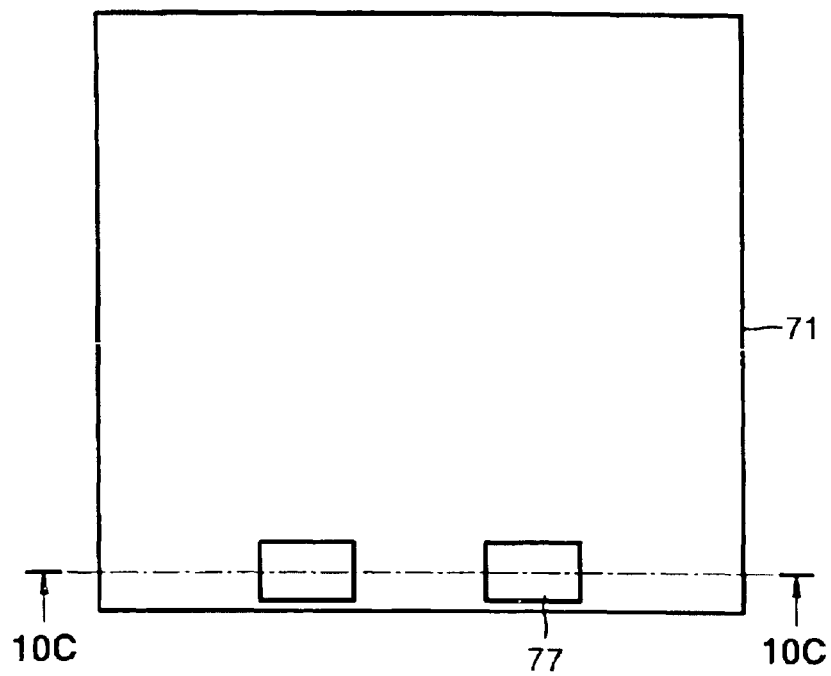
FIG. 11 is a plane view of a substrate for mounting an optical component in the stage shown in FIG. 10C.

FIGS. 10A through 10C and 11 show an example of a procedure of forming the stopper 77 on the substrate 71. Referring to FIG. 10A, after a polymer layer 73 inducing light is formed on the top surface of the substrate 71, a mask 75 having a shape corresponding to the stopper 77 (see FIG. 10C) is disposed on a predetermined position, and then an exposure process is performed. Subsequently, the mask 75 and a part of the polymer layer 73 are removed using a cleaning process, thereby forming a mold 73, as shown in FIG. 10B. Thereafter, an opening 73a of the mold 73 is plated with a metal, thereby forming the stopper 77, and the mold 73 is removed, as shown in FIG. 10C. FIG. 11 is a plane view of the substrate 71 for mounting an optical component, which is obtained after the stage shown in FIG. 10C is performed. FIG. 10C is a cross-sectional view of the substrate 71 taken along the line 10C—10C of FIG. 11.

Another example of a procedure of forming a stopper according to the second embodiment consistent with the present invention is substantially the same as the procedure of forming a stopper that has been described above with reference to FIGS. 8E and 8F. In other words, after a polymer layer formed on the top surface of a substrate is partially exposed and removed using a cleaning process, the polymer remaining on the substrate is used as the stopper. In the meantime, unlike the first embodiment, the stopper is formed before a groove is formed in the second embodiment.

Figure 10D:
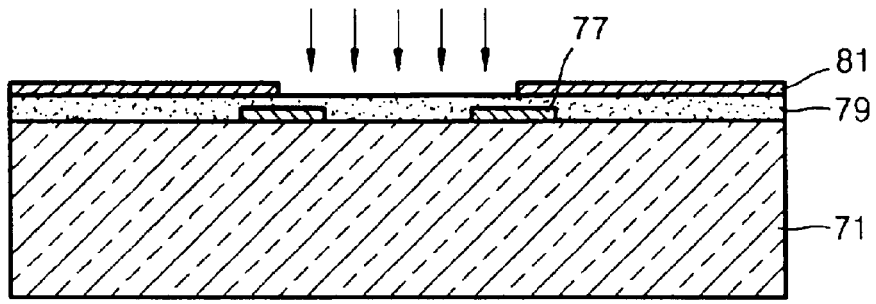
Figure 10E:
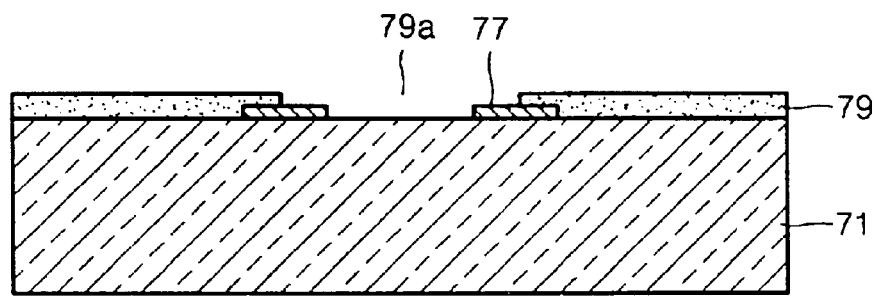

FIGS. 10D through 10G and 12 show a procedure of forming the groove 72 according to the second embodiment consistent with the present invention. Referring to FIG. 10D, a photoresist 79 is applied to the substrate 71 having the stopper 77, a mask 81 having a pattern corresponding to the groove 72, in which the cylindrical lens 41 shown in FIG. 7 is to be mounted, is disposed on the photoresist 79, and then an exposure process is performed. Subsequently, the mask 81 and a part 79a of the photoresist 79 corresponding to the groove 72 are removed using a cleaning process, as shown in FIG. 10E.

Figure 10F:
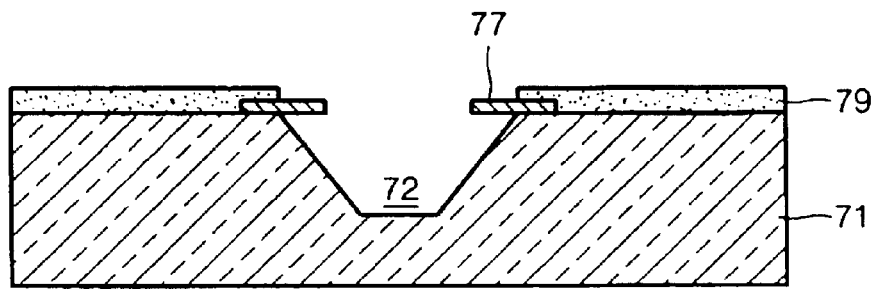

Thereafter, an etching process is performed, thereby forming the groove 72 having a slanted sidewall, as shown in FIG. 10F. In this case, the substrate 71 is a silicon wafer having a <100> crystal orientation, and a nonisotropic etching process is used to form the groove 72. A portion below a part of the stopper 77 is etched due to a convex mask effect.

Figure 10G:
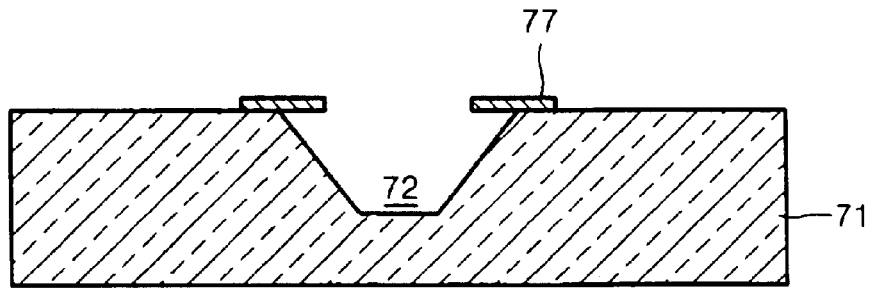
Figure 12:
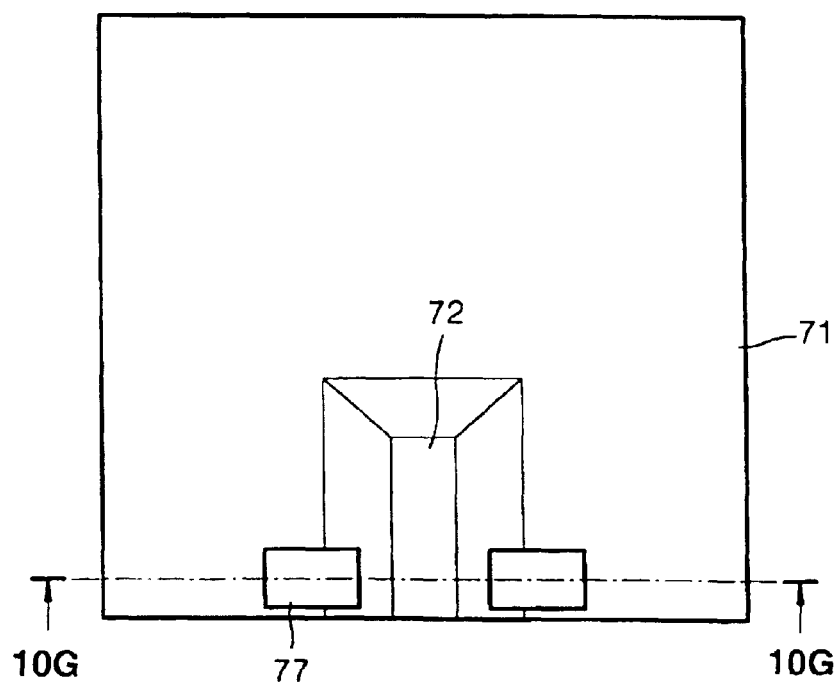
FIG. 12 is a plane view of a substrate for mounting an optical component in the stage shown in FIG. 10G.

Next, the photoresist 79 is removed, thereby completing formation of the stopper 77 and the groove 72, as shown in FIG. 10G. FIG. 12 is a plane view of the substrate 71 for mounting an optical component, which is obtained after the stage shown in FIG. 10G. FIG. 10G is a cross-sectional view of the substrate 71 taken along the line 10G—10G of FIG. 12.

As described above, in a substrate for mounting an optical component and a method of manufacturing the same consistent with the present invention, a stopper guiding the position of a mounted optical component in a z-direction is formed, so a passive alignment can be easily achieved in the z-direction as well as an x-direction even when a cylindrical lens is mounted on the substrate. In addition, the stopper is formed using a photolithographic process, so an assembly tolerance of an optical component in the z-direction can be maintained within ±5 µm. Therefore, when such a substrate consistent with the present invention is used, the quality of an optical spot increases so that a photoelectric device module requiring high photocoupling efficiency can be produced.

It is contemplated that numerous modifications may be made to the substrate and manufacturing method therefor of the present invention without departing from the spirit and scope of the invention as defined in the following claims.

What is claimed is:

1. A substrate for mounting an optical component, the substrate comprising:

a groove, which is recessed into the substrate to have a slanted sidewall; and a stopper, which is formed on the groove such that the stopper is in contact with the optical component mounted in the groove and defines a position of the optical component, wherein a part of the stopper is formed on a top surface of the substrate, and an other part of the stopper is formed along the slanted sidewall of the groove.

2. The substrate of claim 1, wherein the stopper is made of one of a polymer and metallic material.

3. The substrate of claim 2, wherein the stopper made of a metallic material is formed by forming a mold using a polymer and then performing metal plating on the substrate having the mold.

4. The substrate of claim 1, wherein the stopper is formed on the groove using a photolithographic process.

5. A substrate for mounting a cylindrical lens which extends in an axial direction and includes opposite flat end faces, the substrate comprising:

a groove, which is recessed into the substrate to have a slanted sidewall; and a stopper, which is formed on the groove such that the stopper is in contact with one of the flat end faces of the cylindrical lens mounted in the groove and defines a position of the cylindrical lens in the axial direction.

6. The substrate of claim 5, wherein a part of the stopper is formed on a top surface of the substrate, and an other part of the stopper is formed along the slanted sidewall of the groove.

7. The substrate of claim 5, wherein a part of the stopper is formed on a top surface of the substrate, and an other part of the stopper is formed above the sidewall of the groove to be separated from the groove.

8. The substrate of claim 5, wherein the stopper is made of one of a polymer and metallic material.

* * * * *